Dec. 4, 1923.

M. A. RUMSKY 1,476,647

DRAFT RIGGING FOR TRACTORS

Filed Jan. 3, 1922

Inventor.
M. A. Rumsky
Victor J. Evans
By           Attorney.

Patented Dec. 4, 1923.

1,476,647

UNITED STATES PATENT OFFICE.

MICKEL A. RUMSKY, OF CALIPATRIA, CALIFORNIA.

DRAFT RIGGING FOR TRACTORS.

Application filed January 3, 1922. Serial No. 526,729.

*To all whom it may concern:*

Be it known that I, MICKEL A. RUMSKY, a citizen of the United States, residing at Calipatria, in the county of Imperial and State of California, have invented new and useful Improvements in Draft Rigging for Tractors, of which the following is a specification.

This invention relates to a draft rigging for tractors and has particular reference to an equalizing draw bar.

The primary object of this invention is to provide a device adapted to give greater traction to the wheeled vehicle by equalizing the draft and also preventing the front wheels of the tractor from leaving the ground.

A further object of this invention is to provide a device of the character described which is simple in construction, economical to manufacture, and a device which not only is strong, durable and highly efficient but can be readily applied to a tractor without materially altering the construction of the same.

Other objects and advantages will be apparent during the course of the following description.

Figure 1:
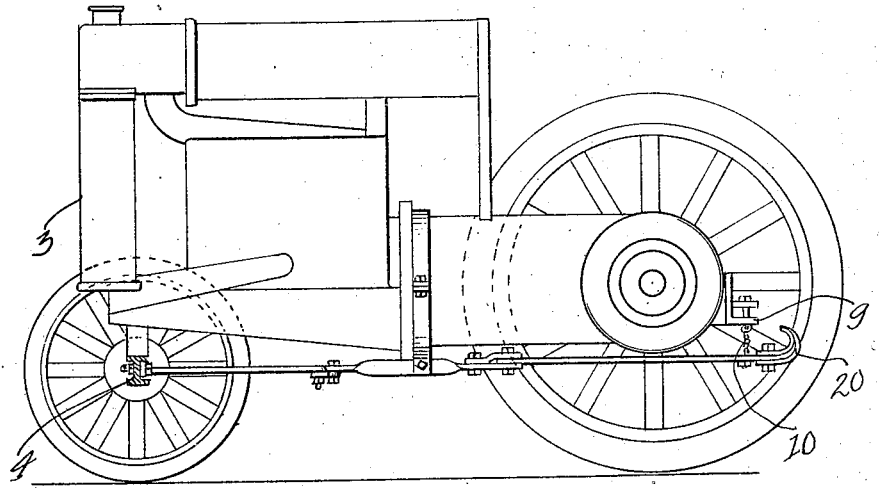
Figure 2:
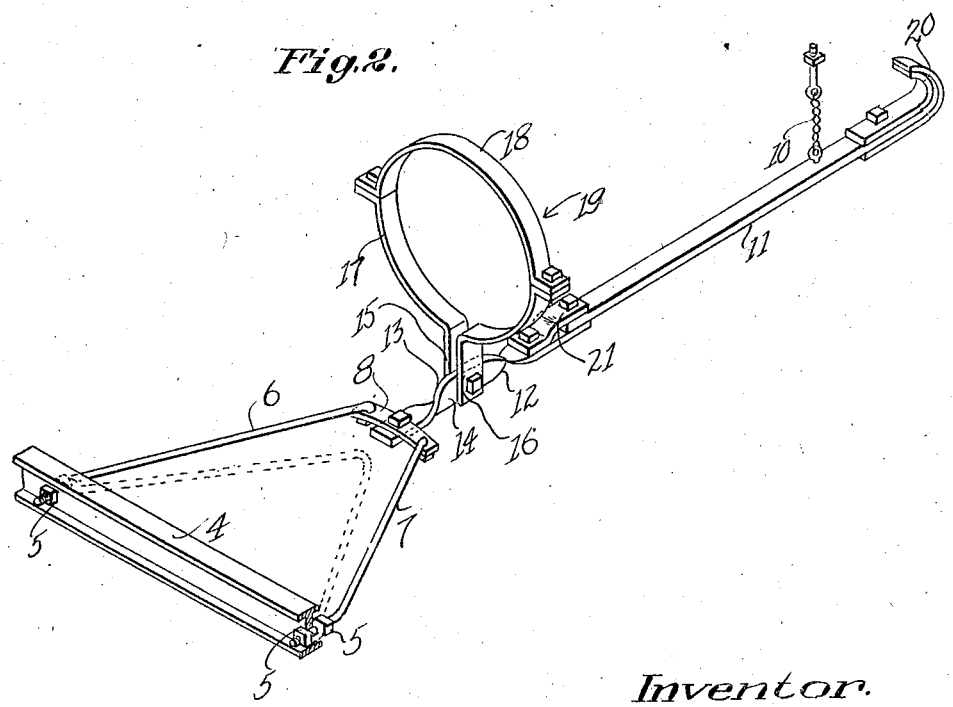

In the accompanying drawings forming a part of this specification, and in which like numerals are employed to designate like parts throughout the same, Fig. 1 is an elevation of a conventionally shown tractor with my invention applied thereto, and Fig. 2 is a perspective view of the draft rigging per se.

In the accompanying drawings wherein for the purpose of illustration is shown a preferred embodiment of my invention, the numeral 3 designates a tractor to which the draft rigging is applied. While I have shown a tractor and the particular application of the rigging to a Fordson tractor, it is to be understood that the device may also be applied to various types of propelled vehicles. The tractor has secured to its front axle 4 by fastening elements 5 the ends of the arms 6 and 7 which have their opposite extremities received and detachably retained in a cross arm 8. By reason of the construction of the arms 6 and 7 with the axle and cross arm, there is thus formed in effect a substantially triangular frame, and its position in relation to the conventional "wishbone" of a tractor is set forth to advantage in Fig. 2.

Suspended from the draw bar cap 9 of the tractor is a chain 10, which chain is of sufficient length to keep the draw bar off the ground and to allow for the usual side movement thereof, which in turn is connected to a draw beam 11 adjacent the rear extremity of the same. Disposed between and pivotally connected to the cross arm 8 and the inner end of the draw beam 11, I have provided a draft bar 12 of substantially one half the length of the draw beam. This draft bar has its central portion distorted so as to present faces 13 and 14, which have respectively contacting therewith and secured thereto, the ends 15 and 16 of the lower semi-circular portion 17 of a sectional band, which portion is connected to an upper semi-circular portion 18 so as to form an annular band, the band being herein designated as a whole by the numeral 19. This band is disposed transversely of the draft bar, and thus lying in a plane at right angles thereto straddles the chest of the transmission case, and thus serves as an intermediate support for the draft rigging and gives rigidity to the draft bar 12, while the triangular frame and the draw beam 11 both pivotally connected to the bar 12 provide the necessary lateral freedom of movement.

The numeral 20 designates a hook which is secured to the end of the draw beam and serves as a suitable hitch for various draft changes as needed for certain agricultural implements, such as harrows, plows, mowers, rakes and also wagons, etc.

In order to make the draft rigging stronger and more efficient I have provided a clip 21 adjacent the point of pivotal connection of the draw beam 11 and the draft bar 12.

It is to be understood that the form of my invention, herewith shown and described is to be taken as a preferred example of the same, and that various changes in the shape, size and arrangement of parts may be resorted to without departing from the spirit of the invention or the scope of the subjoined claim.

Having thus described my invention, I claim:—

In a device of the character described, the combination with a body and front axle of a tractor, a triangular frame secured to said axle, a draw beam suspended from the draw bar cap of the tractor and in such a manner as to allow for vertical and side movement, a draft bar horizontally pivoted to said frame and said draw beam, said draw bar having a vertical central portion, a band encircling the transmission case of said tractor at a point substantially midway of the length of the tractor, and a pivotal connection between the vertical portion of said draw bar and said band.

In testimony whereof I, affix my signature.

MICKEL A. RUMSKY.